(12) United States Patent
Inoue

(10) Patent No.: US 6,337,978 B1
(45) Date of Patent: Jan. 8, 2002

(54) DEDICATED SHORT-RANGE COMMUNICATION MOBILE DEVICE FOR INTELLIGENT TRANSPORT SYSTEMS

(75) Inventor: Masahiro Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/240,666

(22) Filed: Feb. 2, 1999

(30) Foreign Application Priority Data

Oct. 1, 1998 (JP) .......................................... 10-279795

(51) Int. Cl.$^7$ .......................... H04M 11/00; H04Q 7/20
(52) U.S. Cl. .......................... 455/421; 455/69; 455/517
(58) Field of Search ................................ 455/522, 517, 455/69, 70, 421, 441

(56) References Cited

U.S. PATENT DOCUMENTS

| | | |
|---|---|---|
| 4,914,715 A | 4/1990 | Miyata |
| 5,406,275 A * | 4/1995 | Hassett ........................ 340/933 |
| 5,485,486 A * | 1/1996 | Gilhousen ................... 370/335 |
| 5,581,249 A | 12/1996 | Yoshida |
| 5,953,677 A * | 9/1999 | Sato ............................ 455/574 |
| 6,038,444 A * | 3/2000 | Schipper .................... 455/421 |
| 6,138,021 A * | 10/2000 | Arrington ................... 455/436 |

FOREIGN PATENT DOCUMENTS

| | | |
|---|---|---|
| JP | 5-145462 | 6/1993 |
| JP | 6-160505 | 6/1994 |

* cited by examiner

Primary Examiner—Nguyen T. Vo
Assistant Examiner—James K Moore
(74) Attorney, Agent, or Firm—Sughrue Mion, PLLC

(57) ABSTRACT

A dedicated short-range communication mobile device for Intelligent transport systems, including: an antenna; a data transmission/reception circuit for transmitting and receiving data to and from a ground device through the antenna; a first power supply circuit for supplying power to the data transmission/reception circuit; a received electric field strength detecting unit for measuring a power level of a radio wave transmitted from the ground device; a communication area detecting unit for recognizing a communication area based on an output of the received electric field strength detecting unit; a power supply starting unit for starting the first power supply circuit based on an output of the communication area detecting unit; and a second power supply circuit for supplying power to the received electric field strength detecting unit, the communication area detecting unit and the power supply starting unit. As a result of the above configuration, the mobile device can reduce dissipation and does not complicate communication control.

5 Claims, 8 Drawing Sheets

DEDICATED SHORT-RANGE COMMUNICATION MOBILE DEVICE FOR INTELLIGENT TRANSPORT SYSTEMS

BACKGROUND OF THE INVENTION

1. Field of the Invention

The present invention relates to a dedicated short-range communication mobile device for Intelligent transport systems, and more particularly to a dedicated short-range communication mobile device that can reduce dissipation and does not complicate communication control.

2. Description of the Related Art

Intelligent transport systems provide advantages to both drivers and road administrators by allowing a ground device provided on a ground side to communicate with a mobile device provided in a vehicle for various types of data transfer using a dedicated short-range communication (DSRC) system designed for communication within a limited range of road through radio waves in the microwave frequency region.

FIG. 7 is a partial block diagram showing a conventional dedicated short-range communication mobile device for an Intelligent transport system. In FIG. 7, reference numeral 1 denotes a transmission/reception antenna. Reference numeral 2 denotes a data transmission/reception circuit that transmits and receives data to and from a ground device (not shown) through the transmission/reception antenna 1. The data transmission/reception circuit 2 always searches a radio wave from the ground device through the transmission/reception antenna 1 while in operation. When the circuit 2 is ready for data transfer as the power of the searched radio wave has reached a predetermined strength so that the circuit 2 can start transmitting and receiving data to and from the ground device in accordance with a predetermined protocol. Reference numeral 3 denotes a first power supply circuit that supplies power to the data transmission/reception circuit 2. Reference numeral 4 denotes a fixed-value timer. Reference numeral 5 denotes power supply starting means that is operated by the fixed-value timer 4 after the elapse of a predetermined time interval to start the first power supply circuit 3. Reference numeral 6 denotes a second power supply circuit that supplies power to the fixed-value timer 4, the power supply starting means 5 and other devices.

Dedicated short-range communication in the Intelligent transport system is effected within a limited road range as described above. The data transmission/reception circuit 2 always searches a radio wave from the ground device while the vehicle is travelling, and upon detection of the radio wave from the ground device, starts data transfer with the ground device in accordance with a predetermined protocol.

After the data transmission/reception circuit 2 finishes a single round of data transfer with the ground device, the fixed-value timer 4 operates so that the data transmission/reception circuit 2 will not be started again in the same communication area until a predetermined time interval elapses. More specifically, after a single round of data transfer has been terminated, the first power supply circuit 3 stops supplying power to the data transmission/reception circuit 2, and after the elapse of the predetermined time interval, the fixed-value timer 4 operates the power supply starting means 5 so that the first power supply circuit 3 starts its operation again.

FIG. 8 is a partial block diagram showing another conventional dedicated short-range communication mobile device. In FIG. 8, reference numeral 7 denotes a variable-value timer that is set at a reference value contained in the data received from a ground device. That is, the ground device transmits to the mobile device a reference value corresponding to a communication area. The mobile device receives such reference value and sets the variable-value timer 7 at the received reference value. Therefore, when the communication area is wide, the variable-value timer 7 is set at a long time interval, whereas when the communication area is narrow, the timer 7 is set at a short time interval. Other configurational aspects of the device shown in FIG. 8 are the same as those of the device shown in FIG. 7.

With the aforementioned configuration, the conventional dedicated short-range communication mobile device prevents a second round of data transmission and reception within a single communication area.

However, the thus configured dedicated short-range communication mobile devices address a problem when the vehicle is travelling at a very slow velocity or is brought to a complete stop within a predetermined communication area due to, e.g., a traffic jam. That is, the problem is that, under such circumstances, even the mobile devices having the aforementioned configuration disadvantageously permit the data transmission/reception circuit 2 to start its operation again, and thus dissipation is increased. Further, the ground device is compelled to communicate with vehicles it does not have to communicate with, and thus a number of unnecessary communications complicate communication control. From this arises inconvenience that the ground device cannot communicate with the desired vehicle.

SUMMARY OF THE INVENTION

The present invention has been made to overcome the aforementioned problems, and its object is, therefore, to provide a dedicated short-range communication mobile device that can reduce dissipation and does not complicate communication control.

In order to achieve the above object, according to one aspect of the present invention, there is provided a dedicated short-range communication mobile device for Intelligent transport systems which comprises an antenna; a data transmission/reception circuit for transmitting and receiving data to and from a ground device through the antenna; a first power supply circuit for supplying power to the data transmission/reception circuit; received electric field strength detecting means for measuring a power level of a radio wave from the ground device received through the antenna; communication area detecting means for recognizing, as a communication area, an area in which the power level of the radio wave from the ground device exceeds a predetermined value based on an output of the received electric field strength detecting means; power supply starting means for starting the first power supply circuit based on an output of the communication area detecting means; and a second power supply circuit for supplying power to the received electric field strength detecting means, the communication area detecting means and the power supply starting means.

According to another aspect of the present invention, there is provided a dedicated short-range communication mobile device for Intelligent transport systems, wherein the output of the received electric field strength detecting means is inputted to the communication area detecting means through a filter for preventing fluctuations in received electric field strength to be caused by phasing of the radio wave from the ground device.

According to still another aspect of the present invention, there is provided a dedicated short-range communication mobile device for Intelligent transport systems, which has velocity detecting means for detecting a velocity of a vehicle at the time of data transmission and reception based on a trigger from the data transmission/reception circuit; and area end predicting means for calculating a travel distance based on an output of the velocity detecting means and predicting an end of a communication area.

According to a further aspect of the present invention, there is provided a dedicated short-range communication mobile device for Intelligent transport systems which comprises an antenna; a data transmission/reception circuit for transmitting and receiving data to and from a ground device through the antenna; a first power supply circuit for supplying power to the data transmission/reception circuit; velocity detecting means for detecting a velocity of a vehicle at the time of data transmission and reception based on a trigger from the data transmission/reception circuit; travel distance integrating means for integrating a travel distance based on an output of the velocity detecting means; communication area detecting means for recognizing a communication area by determining an end of the communication area when the travel distance exceeds a predetermined value; power supply starting means for starting the first power supply circuit based on an output of the communication area detecting means; and a second power supply circuit for supplying power to the velocity detecting means, the travel distance integrating means, the communication area detecting means and the power supply starting means.

According to a still further aspect of the present invention, there is provided a dedicated short-range communication mobile device for Intelligent transport systems which comprises an antenna; a data transmission/reception circuit for transmitting and receiving data to and from a ground device through the antenna; a first power supply circuit for supplying power to the data transmission/reception circuit; velocity detecting means for detecting a velocity of a vehicle at the time of data transmission and reception based on a trigger from the data transmission/reception circuit; a velocity corresponding timer that is set at a value in correspondence with an output of the velocity detecting means; communication area detecting means for recognizing a communication area based on an output of the velocity corresponding timer; power supply starting means for starting the first power supply circuit based on an output of the communication area detecting means; and a second power supply circuit for supplying power to the velocity detecting means, the travel distance integrating means, the communication area detecting means and the power supply starting means.

DETAILED DESCRIPTION OF THE PREFERRED EMBODIMENTS

First Embodiment

Figure 1:
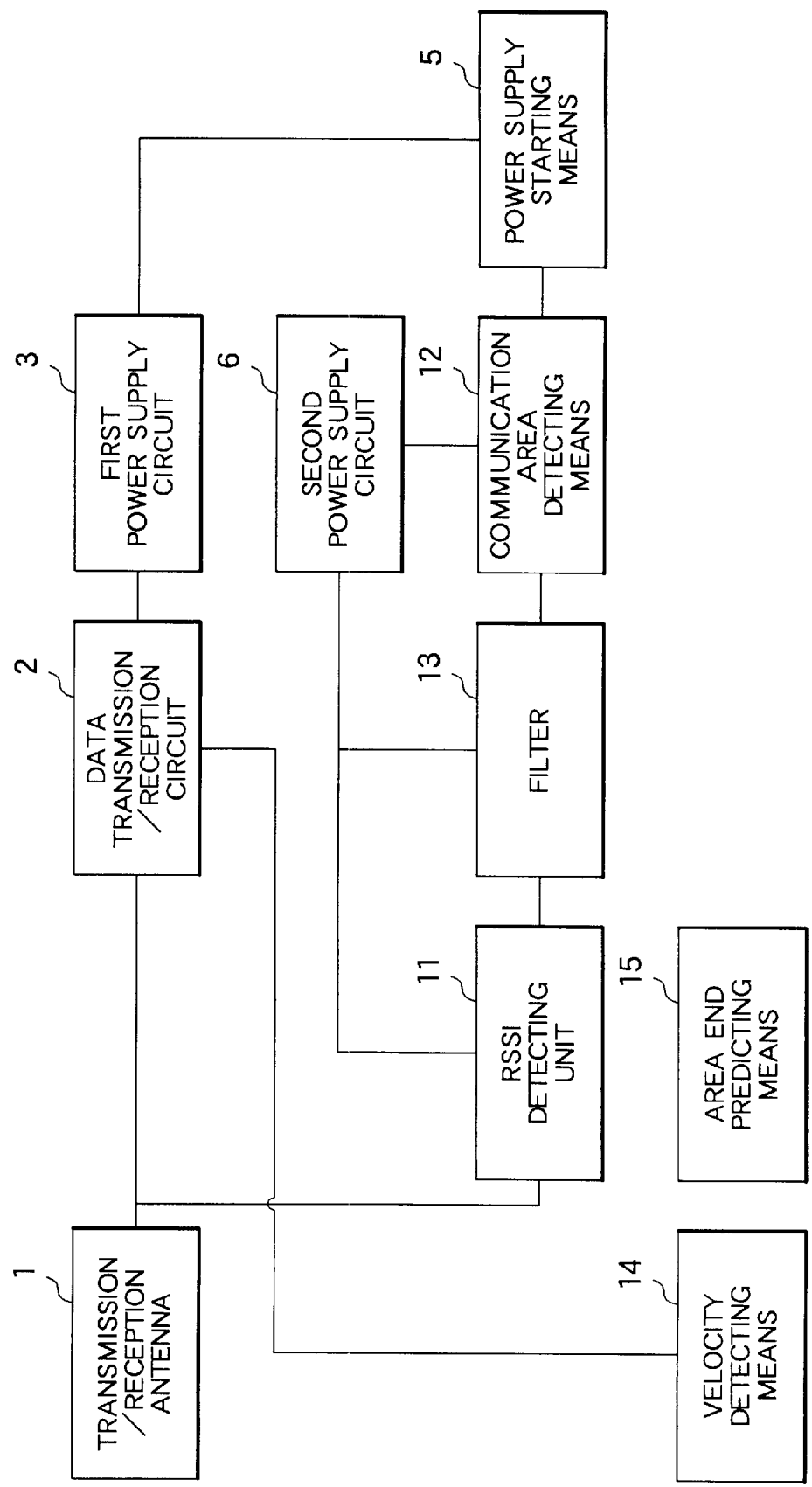
FIG. 1 is a partial block diagram showing a dedicated short-range communication mobile device for Intelligent transport systems of the present invention.

FIG. 1 is a partial block diagram showing a dedicated short-range communication mobile device for Intelligent transport systems of the present invention. In FIG. 1, reference numeral 1 denotes a transmission/reception antenna. Reference numeral 2 denotes a data transmission/reception circuit that transmits and receives data to and from a ground device (not shown) through the transmission/reception antenna 1. The data transmission/reception circuit 2 always searches a radio wave from the ground device through the transmission/reception antenna 1 while in operation, and when the power of the received radio wave reaches a predetermined strength so that the circuit 2 becomes ready for data transfer, the circuit 2 starts transmitting and receiving data to and from the ground device in accordance with a predetermined protocol. Reference numeral 3 denotes a first power supply circuit that supplies power to the data transmission/reception circuit 2. Reference numeral 5 denotes power supply starting means that starts the first power supply circuit 3.

Reference numeral 11 denotes an RSSI (Received Signal Strength Indicator) detecting means that detects a received electric field strength for measuring the strength of the received power of a radio wave transmitted from the ground device. Reference numeral 12 denotes communication area detecting means that recognizes a communication area based on an output of the RSSI detecting means 11. The communication area detecting means 12 detects the rise and fall of a power signal received from the ground device based on an output of the RSSI detecting means 11 as a segment, and recognizes the detected segment as a single communication area. That is, the means 12 recognizes, as a single communication area, a segment in which an output of the RSSI detecting means 11 exceeds a predetermined value. The power supply starting means 5 operates based on an output of the communication area detecting means 12, and does not start the first power supply circuit 3 when a vehicle is present in a single communication area.

In FIG. 1, reference numeral 13 denotes a filter that prevents fluctuations in received electric field strength which are caused by phasing of a radio wave from the ground device. Generally, a radio wave from the ground device is subject to phasing that reduces the power level of the radio wave instantaneously, e.g., when the driver's vehicle is passed by a truck. A filter 13 mitigates such phasing-derived reduction in the received electric field strength and thereby eliminates phasing-derived erroneous recognitions to be made by the communication area detecting means 12.

Further, in FIG. 1, reference numeral 14 denotes velocity detecting means that detects the velocity of a vehicle. Further, reference numeral 15 denotes area end predicting means that assumes the travel distance and predicts the end of a single communication area based on an output of the velocity detecting means 14. The communication area detecting means 12 also considers an output of the area end predicting means 15 to recognize the communication area. That is, the communication area detecting means 12 recognizes the end of a single communication area only when the following conditions are satisfied: the output of the RSSI detecting means 11 is below a predetermined value; and the area end predicting means 15 predicts the end. Reference numeral 6 denotes a second power supply circuit that supplies power to the RSSI detecting means 11, the communication area detecting means 12, the filter 13 and the like, in a manner roughly similar to that of the conventional device.

Figure 2:
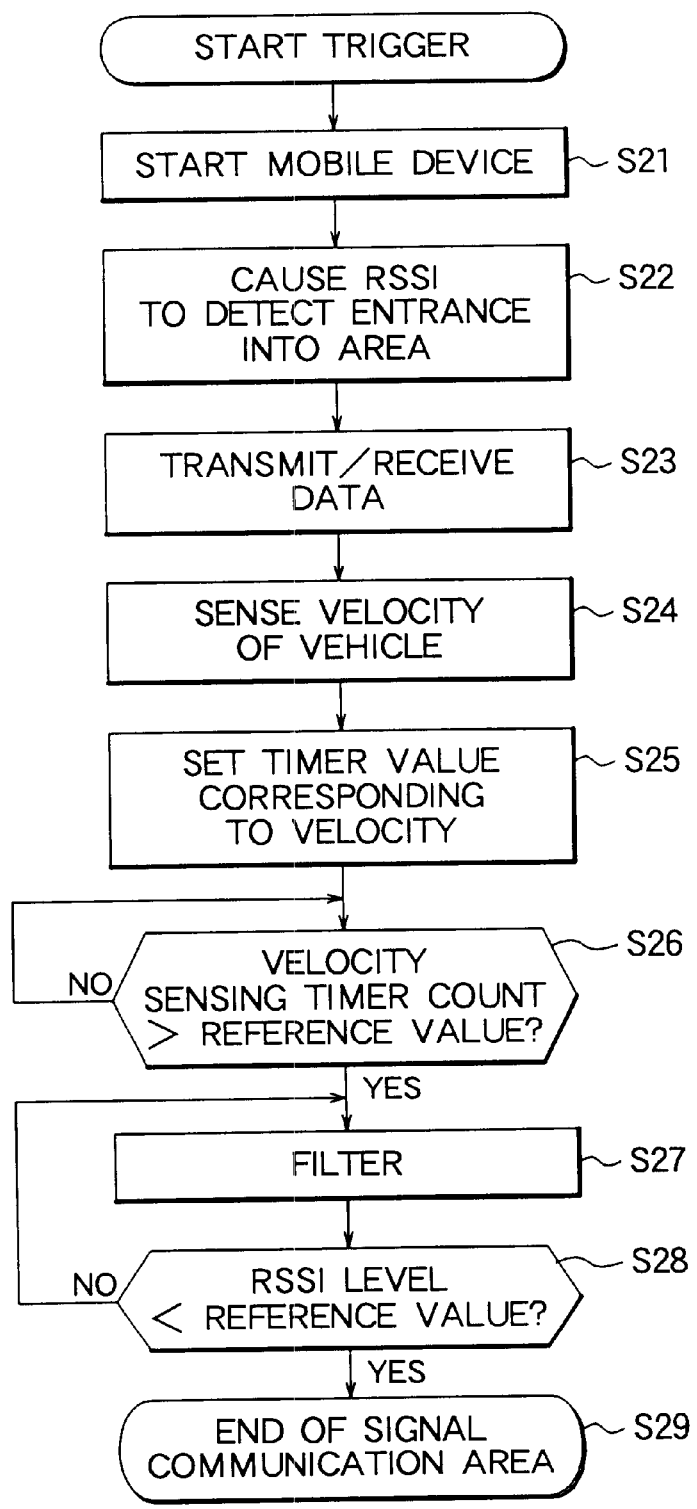
FIG. 2 is a flowchart outlining an operation of the dedicated short-range communication mobile device.

FIG. 2 is a flowchart outlining an operation of the dedicated short-range communication mobile device. The operation will be described in line with FIG. 2. When the mobile device is started by a start trigger (Step S21), and the RSSI detecting means 11 detects entrance of the mobile device into a communication area (Step S22), the data transmission/reception circuit 2 communicates with the ground device for data transfer, and when the communication ends, it stops supplying power to the first power supply circuit 3 (Step S23). Then, the velocity detecting means 14 detects the velocity of the vehicle (Step S24), and sets a timer value corresponding to the detected velocity as a reference value (Step S25). Then, it is determined whether or not the count of a velocity sensing timer exceeds the reference value (Step S26). If it is determined affirmatively, the filter 13 performs a predetermined process (Step S27), and the communication area detecting means 12 thereafter determines whether or not the output of the RSSI detecting means 11 is below a predetermined reference value (Step S28). If it is determined affirmatively, the communication area detecting means 12 recognizes the end of the communication area, and the power supply starting means 5 starts the first power supply circuit 3 (Step S29).

In the thus configured dedicated short-range communication mobile device for Intelligent transport systems, dissipation is not increased because the data transmission/reception circuit 2 is not started again even if the passing velocity of the vehicle in a predetermined communication area is extremely slow or is brought to zero due to, e.g., a traffic jam. Further, the ground device is not compelled to repeat communications with vehicles it does not have to transfer data with. That is, the ground device gets rid of unnecessary communications, and thus the inconvenience that the ground device cannot communicate with the desired vehicle can be eliminated.

While the first power supply circuit 3 according to this embodiment serves for the data transmission/reception circuit 2, the data transmission/reception circuit 2 and the first power supply circuit 3 may be arranged in the following mode. The data transmission/reception circuit 2 may be split into a data transmission circuit and a data reception circuit, and the first power supply circuit 3 may be split into a first power supply circuit 1-1 for data reception and a first power supply circuit 1-2 for data transmission. In this case, the power supply starting means 5 starts only the first power supply circuit 1-1 for data reception when necessary. On the other hand, the first power supply circuit 1-2 for data transmission is started only when the mobile device transmits data, and is disconnected upon the end of the transmission. As a result of such configuration, a further reduction in dissipation can be achieved.

Second Embodiment

Figure 3:
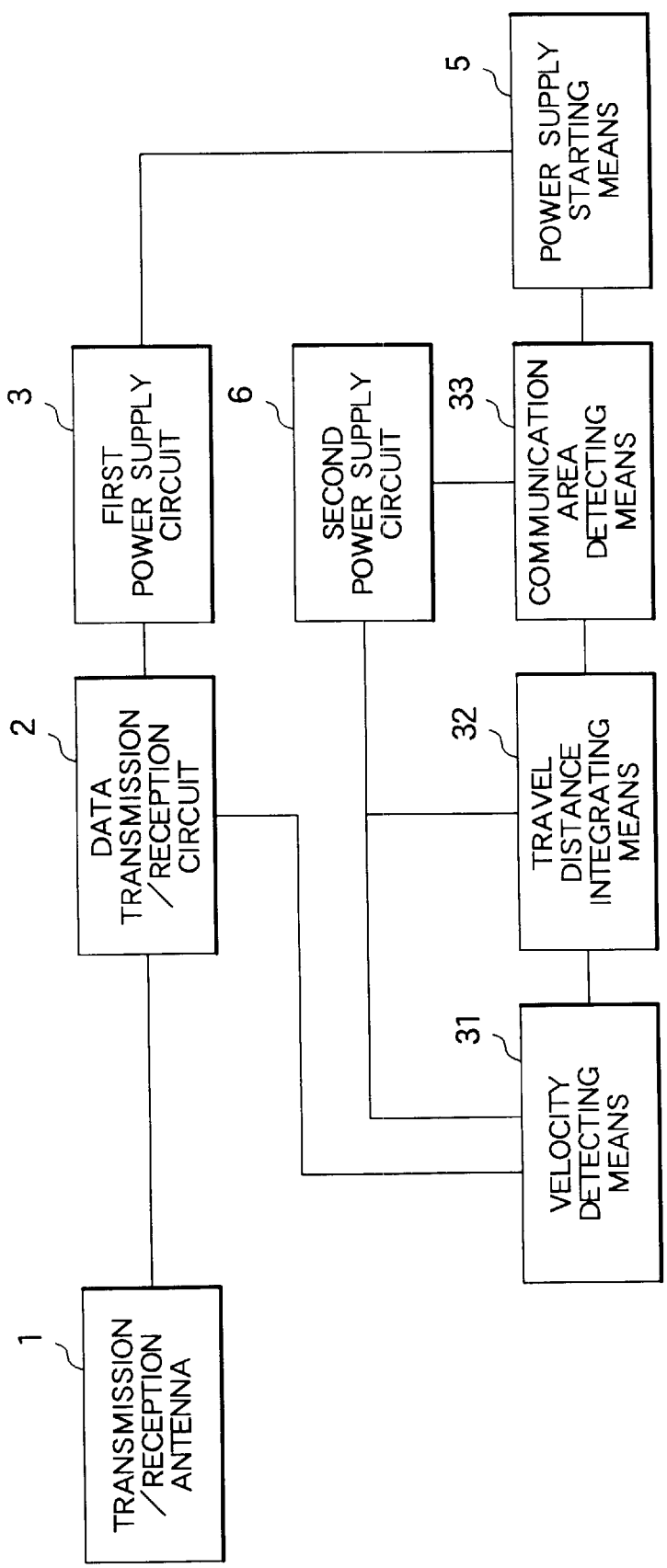
FIG. 3 is a partial block diagram showing another dedicated short-range communication mobile device for Intelligent transport systems of the present invention.

FIG. 3 is a partial block diagram showing another dedicated short-range communication mobile device for Intelligent transport systems of the present invention. In FIG. 3, reference numeral 31 denotes velocity detecting means that detects a velocity of a vehicle. Reference numeral 32 denotes travel distance integrating means that integrates a travel distance based on an output of the velocity detecting means 31. Reference numeral 33 denotes communication area detecting means that recognizes the end of a single communication area based on an output of the travel distance integrating means 32.

Other configurational aspect of this embodiment is similar to those of the first embodiment.

Figure 4:
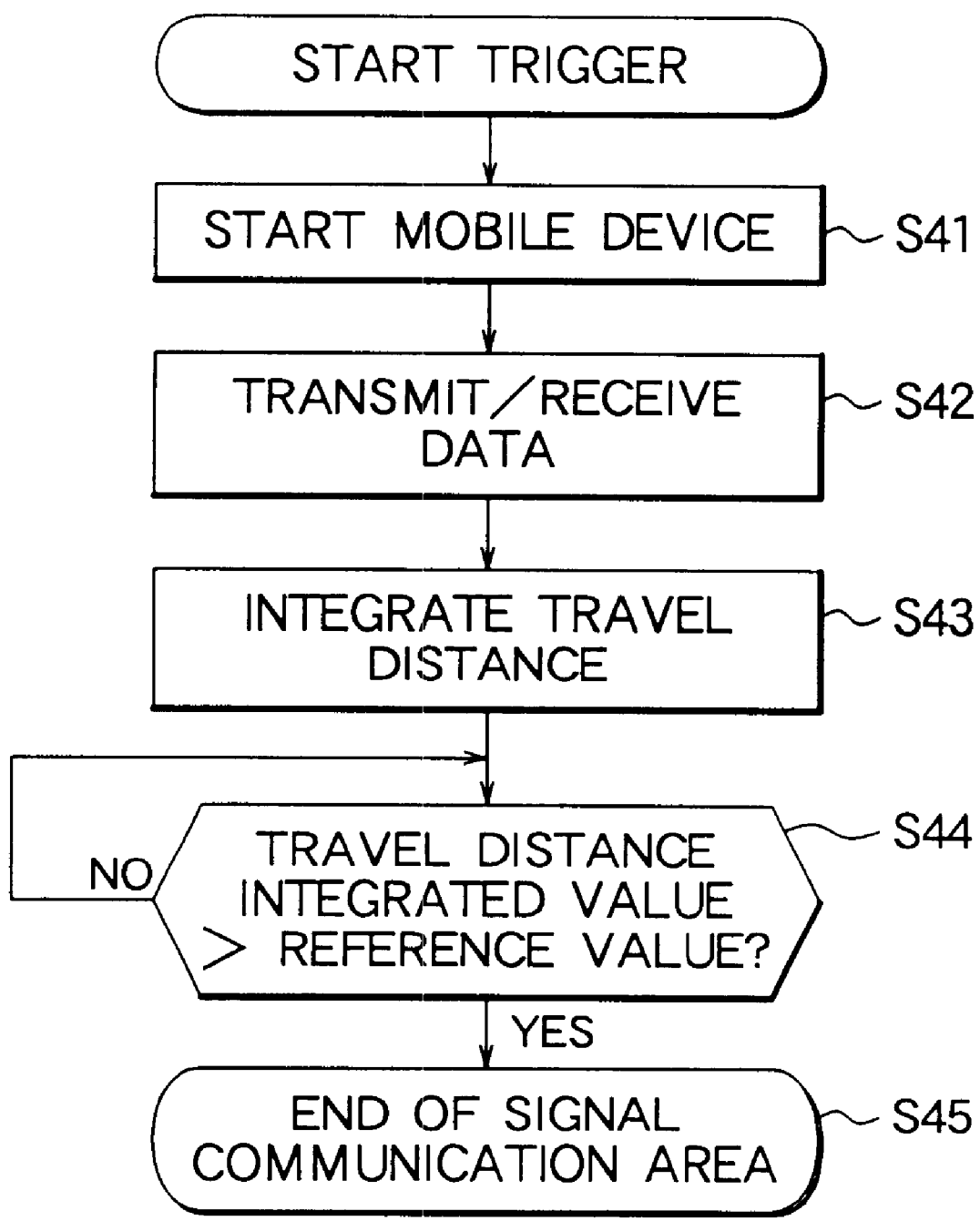
FIG. 4 is a flowchart outlining an operation of the dedicated short-range communication mobile device.

FIG. 4 is a flowchart outlining an operation of the dedicated short-range communication mobile device according to this embodiment. The operation will be described in line with FIG. 4. The mobile device is started by a start trigger (Step S41), and when the mobile device thereafter enters a communication area, the data transmission/reception circuit 2 communicates with a ground device for data transfer. Upon the end of the communication, it stops supplying power to the first power supply circuit 3 (Step S42). Then, the velocity detecting means 31 detects the velocity of a vehicle, and the travel distance integrating means 32 integrates the travel distance based on an output of the means 31 (Step S43). The communication area detecting means 33 determines whether or not the travel distance exceeds a predetermined reference value (Step S44). If it is determined affirmatively, the communication area detecting means 33 recognizes the end of the communication area, and the power supply starting means 5 starts the first power supply circuit 3 (Step S45).

In the thus configured dedicated short-range communication mobile device for Intelligent transport systems, the travel distance integrating means 32 integrates the travel distance after data has been transmitted and received, and the communication area detecting means 33 recognizes the end of a communication area when the travel distance exceeds a predetermined reference value. Therefore, advantages similar to those of the first embodiment can be obtained.

Third Embodiment

Figure 5:
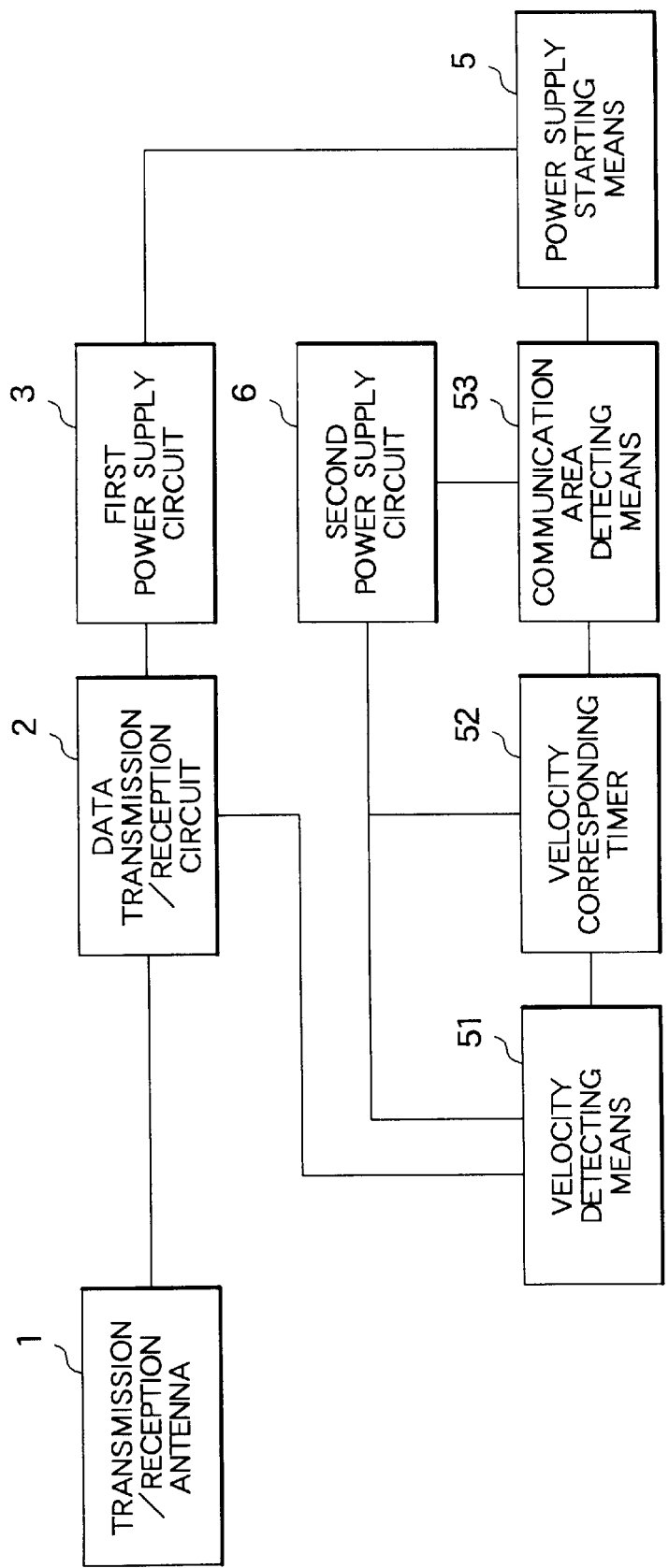
FIG. 5 is a partial block diagram showing another dedicated short-range communication mobile device for Intelligent transport systems of the present invention.

FIG. 5 is a partial block diagram showing another dedicated short-range communication mobile device for Intelligent transport systems of the present invention. In FIG. 5, reference numeral 51 denotes a velocity detecting means that detects a velocity of a vehicle. Reference numeral 52 denotes a velocity corresponding timer that is set at a reference value based on an output of the velocity detecting means 51. Reference numeral 53 denotes a communication area detecting means that recognizes the end of a single communication area based on an output of the velocity corresponding timer.

Other configurational aspect of this embodiment is similar to those of the first embodiment.

Figure 6:
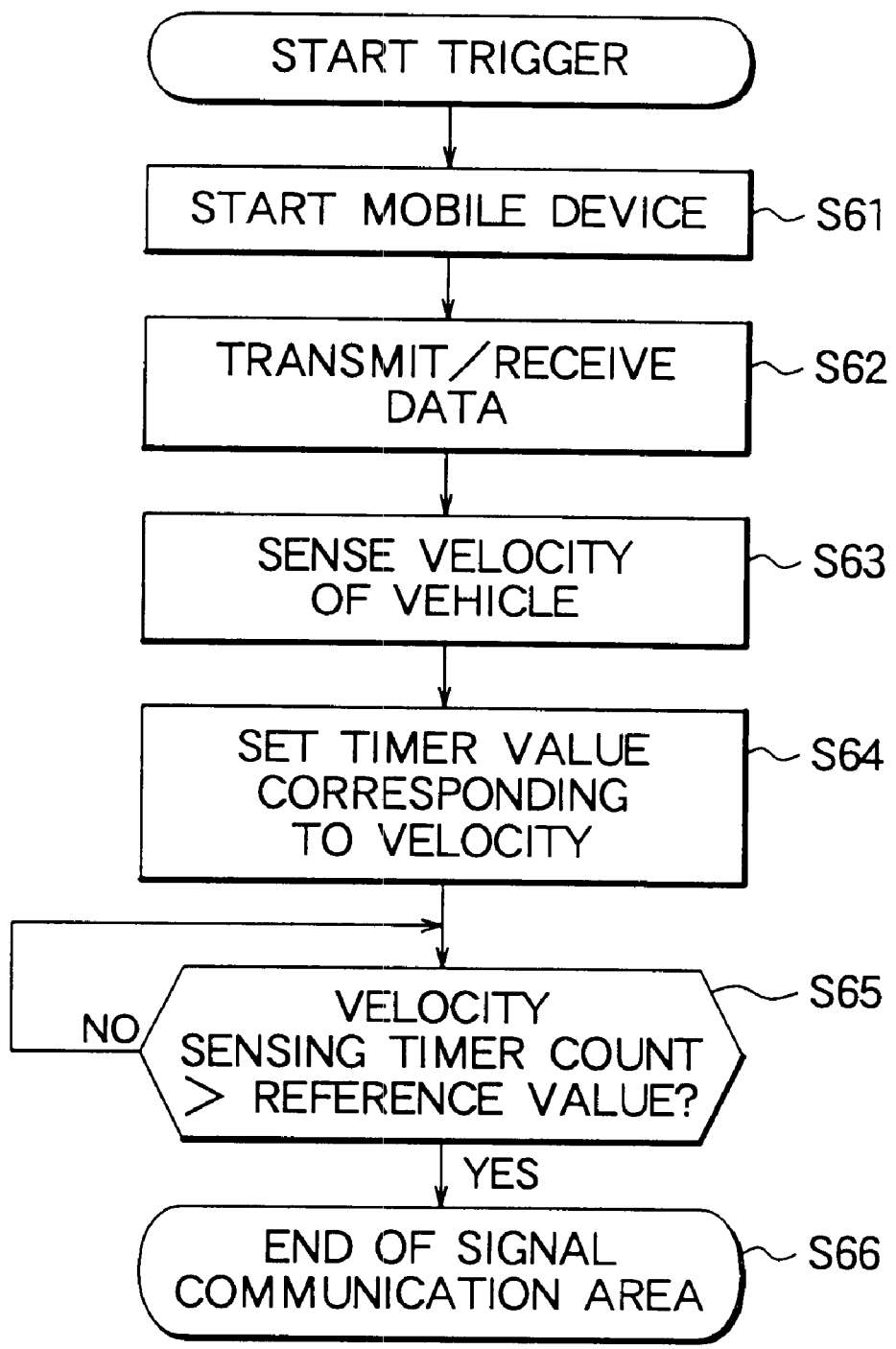
FIG. 6 is a flowchart outlining an operation of the dedicated short-range communication mobile device.
Figure 7:
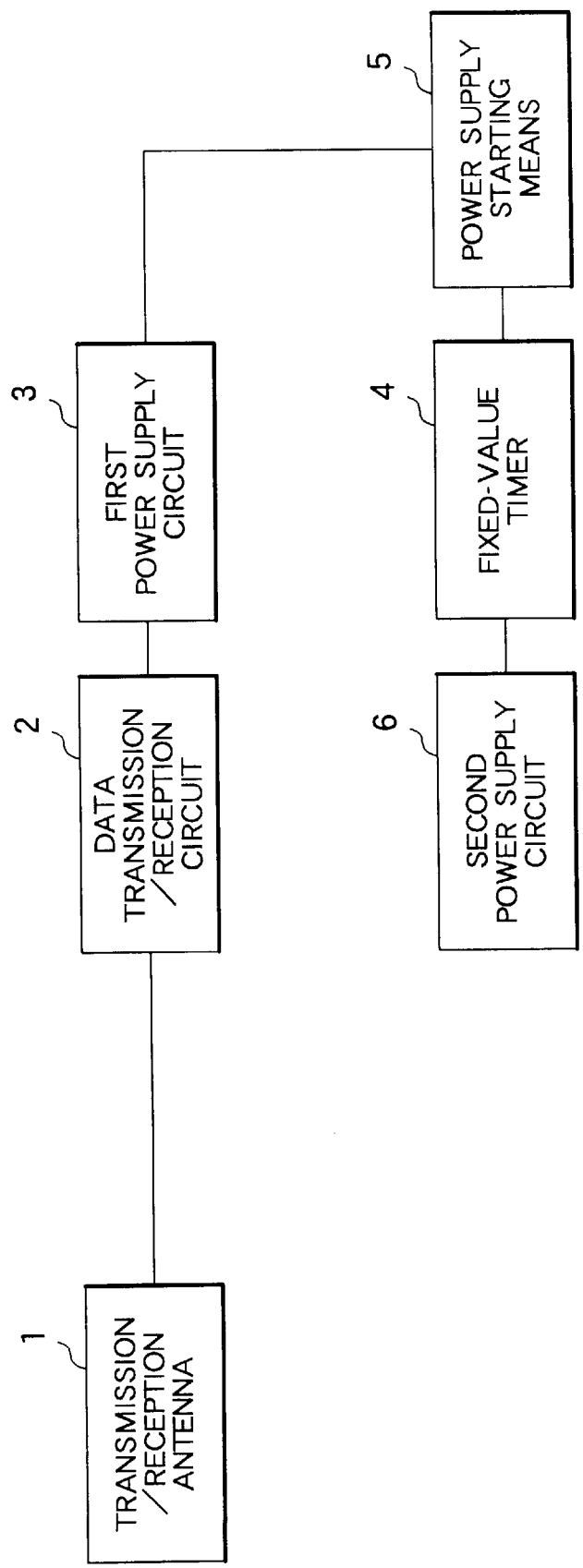
FIG. 7 is a partial block diagram showing a conventional dedicated short-range communication mobile device for Intelligent transport systems.
Figure 8:
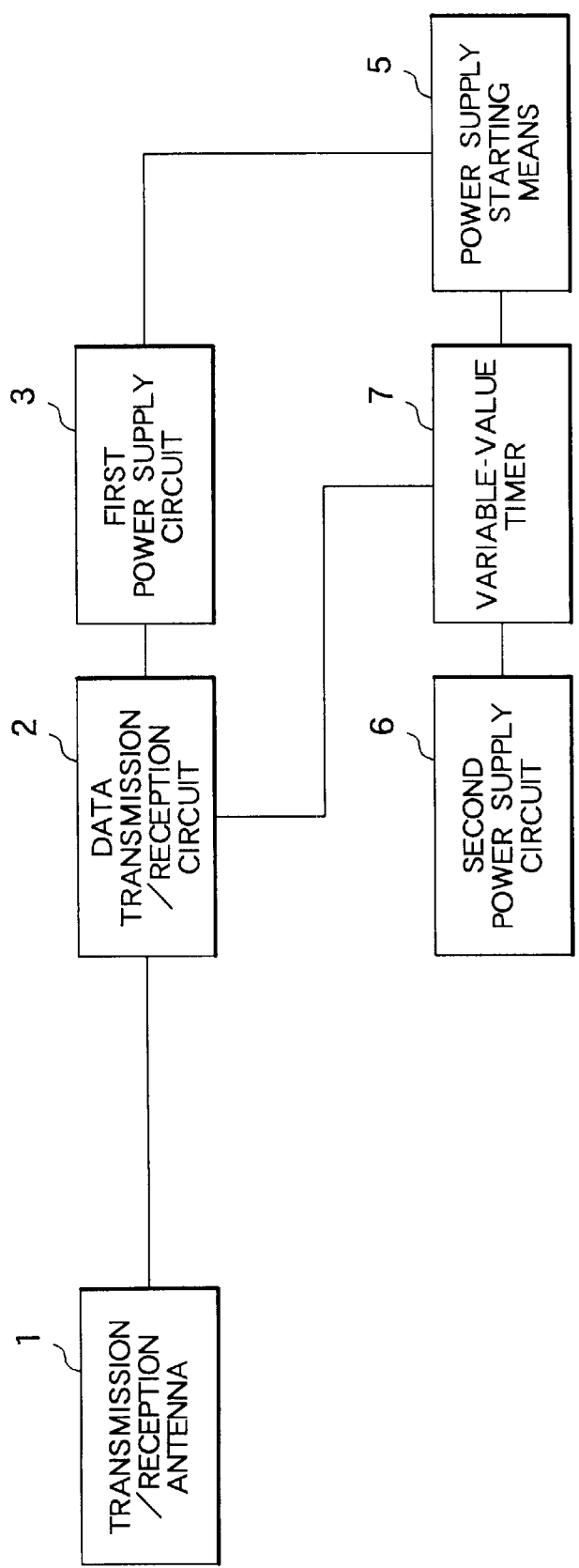
FIG. 8 is a partial block diagram showing another conventional dedicated short-range communication mobile device.

FIG. 6 is a flowchart outlining an operation of the dedicated short-range communication mobile device according to this embodiment. The operation will be described in line with FIG. 6. The mobile device is started by a start trigger (Step S61), and when the mobile device thereafter enters a communication area, the data transmission/reception circuit 2 communicates with a ground device for data transfer. Further, upon the end of the communication, it stops supplying power to the first power supply circuit 3 (Step S62). Then, the velocity detecting means 51 detects the velocity of the vehicle, and the velocity corresponding timer 52 is set at a reference value based on an output of the velocity detecting means 51 (Step S64). The communication area detecting means 53 determines whether or not the count of the velocity corresponding timer 52 exceeds the reference value (Step S65). If it is determined affirmatively, the communication area detecting means 53 recognizes the end of the communication area, and the power supply starting means 5 starts the first power supply circuit 3 (Step S66).

In the thus configured dedicated short-range communication mobile device for Intelligent transport systems, the velocity corresponding timer 52 is set at a reference value corresponding to the velocity of a vehicle, and the communication area detecting means 53 recognizes the end of the communication area when the count of the velocity corresponding timer 52 exceeds the reference value. Therefore, advantages similar to those of the first embodiment can be obtained.

While the velocity corresponding timer 52 according to this embodiment is set at a timer value based on the output of the velocity detecting means 51, the timer value may be set based on data transmitted from the ground device. That is, the ground device that recognizes the velocity of a passing vehicle from an interval between vehicles transmits the recognized velocity by incorporating the recognized velocity into the data that the ground device transmits to the vehicle. The mobile device receives the data, and extracts the velocity from the received data and sets the extracted velocity as the timer value. As a result of such arrangement, a more appropriate velocity of the vehicle within a communication area can be obtained, which in turn allows the communication area detecting means 53 to recognize the communication area more correctly.

According to one aspect of the present invention, there is provided a dedicated short-range communication mobile device for Intelligent transport systems which comprises an antenna; a data transmission/reception circuit for transmitting and receiving data to and from a ground device through the antenna; a first power supply circuit for supplying power to the data transmission/reception circuit; received electric field strength detecting means for measuring a power level of a radio wave from the ground device received through the antenna; communication area detecting means for recognizing, as a communication area, an area in which the power level of the radio wave from the ground device exceeds a predetermined value based on an output of the received electric field strength detecting means; power supply starting means for starting the first power supply circuit based on an output of the communication area detecting means; and a second power supply circuit for supplying power to the received electric field strength detecting means, the communication area detecting means and the power supply starting means. As a result, the mobile device can reduce dissipation and does not complicate communication control.

According to another aspect of the present invention, there is provided a dedicated short-range communication mobile device for Intelligent transport systems, wherein the output of the received electric field strength detecting means is inputted to the communication area detecting means through a filter for preventing fluctuations in received electric field strength to be caused by phasing of the radio wave from the ground device. As a result, erroneous recognitions to be made by the communication area detecting means can be eliminated, and thus the reliability of the mobile device can be improved.

According to still another aspect of the present invention, there is provided a dedicated short-range communication mobile device for Intelligent transport systems, which has velocity detecting means for detecting a velocity of a vehicle at the time of data transmission and reception based on a trigger from the data transmission/reception circuit; and area end predicting means for calculating a travel distance based on an output of the velocity detecting means and predicting an end of a communication area. As a result, the communication area detecting means can make correct recognitions of the communication area, and thus the reliability of the mobile device can be improved.

According to a further aspect of the present invention, there is provided a dedicated short-range communication mobile device for Intelligent transport systems which comprises an antenna; a data transmission/reception circuit for transmitting and receiving data to and from a ground device through the antenna; a first power supply circuit for supplying power to the data transmission/reception circuit; velocity detecting means for detecting a velocity of a vehicle at the time of data transmission and reception based on a trigger from the data transmission/reception circuit; travel distance integrating means for integrating a travel distance based on an output of the velocity detecting means; communication area detecting means for recognizing a communication area by determining an end of the communication area when the travel distance exceeds a predetermined value; power supply starting means for starting the first power supply circuit based on an output of the communication area detecting means; and a second power supply circuit for supplying power to the velocity detecting means, the travel distance integrating means, the communication area detecting means and the power supply starting means. As a result, the mobile device can reduce dissipation and does not complicate communication control.

According to a still further aspect of the present invention, there is provided a dedicated short-range communication mobile device for Intelligent transport systems which comprises an antenna; a data transmission/reception circuit for transmitting and receiving data to and from a ground device through the antenna; a first power supply circuit for supplying power to the data transmission/reception circuit; velocity detecting means for detecting a velocity of a vehicle at the time of data transmission and reception based on a trigger from the data transmission/reception circuit; a velocity corresponding timer that is set at a value in correspondence with an output of the velocity detecting means; communication area detecting means for recognizing a communication area based on an output of the velocity corresponding timer; power supply starting means for starting the first power supply circuit based on an output of the communication area detecting means; and a second power supply circuit for supplying power to the velocity detecting means, the travel distance integrating means, the communication area detecting means and the power supply starting means. As a result, the mobile device can reduce dissipation and does not complicate communication control.

What is claimed is:

1. A dedicated short-range communication mobile device for intelligent transport systems comprising:
   an antenna;
   a data transmission/reception circuit for transmitting and receiving data to and from a ground device through said antenna;
   a first discrete power supply circuit for supplying power to said data transmission/reception circuit;
   received electric field strength detecting means for measuring a power level of a radio wave from the ground device received through said antenna;
   communication area detecting means for recognizing, as a communication area, an area in which the power level of the radio wave from the ground device exceeds a predetermined value based on an output of said received electric field strength detecting means;
   power supply starting means for starting said first discrete power supply circuit based on an output of said communication area detecting means; and a second discrete power supply circuit for supplying power to said received electric field strength detecting means, said communication area detecting means and said power supply starting means.

2. A dedicated short-range communication mobile device for Intelligent transport systems according to claim 1, wherein the output of said received electric field strength detecting means is inputted to said communication area detecting means through a filter for preventing fluctuations in received electric field strength to be caused by phasing of the radio wave from the ground device.

3. A dedicated short-range communication mobile device for Intelligent transport systems according to claim 1, further comprising:

velocity detecting means for detecting a velocity of a vehicle at the time of data transmission and reception based on a trigger from said data transmission/reception circuit; and area end predicting means for calculating a travel distance based on an output of said velocity detecting means and predicting an end of a communication area.

4. A dedicated short-range communication mobile device for intelligent transport systems comprising:

an antenna;

a data transmission/reception circuit for transmitting and receiving data to and from a ground device through said antenna;

a first discrete power supply circuit for supplying power to said data transmission/reception circuit;

velocity detecting means for detecting a velocity of a vehicle at the time of data transmission and reception based on a trigger from said data transmission/reception circuit;

travel distance integrating means for integrating a travel distance based on an output of said velocity detecting means;

communication area detecting means for recognizing a communication area by determining an end of the communication area when the travel distance exceeds a predetermined value;

power supply starting means for starting said first discrete power supply circuit based on an output of said communication area detecting means; and a second discrete power supply circuit for supplying power to said velocity detecting means, said travel distance integrating means, said communication area detecting means and said power supply starting means.

5. A dedicated short-range communication mobile device for intelligent transport systems comprising:

an antenna;

a data transmission/reception circuit for transmitting and receiving data to and from a ground device through said antenna;

a first discrete power supply circuit for supplying power to said data transmission/reception circuit;

velocity detecting means for detecting a velocity of a vehicle at the time of data transmission and reception based on a trigger from said data transmission/reception circuit;

a velocity corresponding timer that is set at a value in correspondence with an output of said velocity detecting means;

communication area detecting means for recognizing a communication area based on an output of said velocity corresponding timer;

power supply starting means for starting the first discrete power supply circuit based on an output of said communication area detecting means; and a second discrete power supply circuit for supplying power to said velocity detecting means, said velocity corresponding timer, said communication area detecting means and said power supply starting means.

* * * * *